(12) United States Patent
Lee et al.

(10) Patent No.: US 8,163,267 B1
(45) Date of Patent: Apr. 24, 2012

(54) METHOD OF SYNTHESIZING MAGNESIUM-COBALT PENTAHYDRIDE

(75) Inventors: Sheng-Long Lee, Taoyuan County (TW); Rong-Ruey Jeng, Taoyuan County (TW); Che-Wei Hsu, Tainan (TW); Yu-Chou Tsai, Taoyuan County (TW)

(73) Assignee: National Central University, Taoyuan County (TW)

( * ) Notice: Subject to any disclaimer, the term of this patent is extended or adjusted under 35 U.S.C. 154(b) by 0 days.

(21) Appl. No.: 13/187,517

(22) Filed: Jul. 21, 2011

(30) Foreign Application Priority Data

Jan. 25, 2011 (TW) .............................. 00102667 A (51) Int. Cl.
*C01B 6/24* (2006.01)
*C22C 23/00* (2006.01)
*C22C 19/07* (2006.01)

(52) U.S. Cl. ......... 423/644; 420/402; 420/435; 420/900

(58) Field of Classification Search .................. 420/900, 420/402, 435; 423/644–658.3, 155, 156, 423/157, 158, 168, 138–154
See application file for complete search history.

(56) References Cited

U.S. PATENT DOCUMENTS

| 6,647,166 B2 * | 11/2003 | Richardson ..................... 385/16 |
| 7,648,598 B2 | 1/2010 | Lee et al. |
| 2010/0184595 A1 | 7/2010 | Vajo et al. |

FOREIGN PATENT DOCUMENTS

TW  I321158  3/2010

OTHER PUBLICATIONS

Fernandez et al."Reversible hydrogen storage in Mg2CoH2 prepared by a combined milling-sintering procedure", Dec. 2006, Journal of Alloys and Compounds 446-447, p. 106-109.*
Research and Fabricating Process Development of Li-Al Based and Li-N Based Complex Hydrieds (Department of Mechanical Engineering of National Central University, a doctoral dissertation, Yu-Chou Tasi, 2010).
The Study of Mg-Ni Hydrogen Storage Alloy (Department of Mechanical Engineering of National Central University, a Master Paper, Che-Wei Hsu, 2006).

* cited by examiner

*Primary Examiner* — Stanley Silverman
*Assistant Examiner* — Syed Iqbal
(74) *Attorney, Agent, or Firm* — CKC & Partners Co., Ltd.

(57) ABSTRACT

In a method of synthesizing magnesium-cobalt pentahydride, a $MgCo_2$ alloy is synthesized by completely reacting cobalt (Co) metal and excess magnesium (Mg) metal, followed by an isothermal evaporation casting process (IECP) for removing the residual magnesium metal. Then, the magnesium-cobalt alloy and another magnesium metal are ball-milled and hydrogenated to synthesize the magnesium-cobalt pentahydride ($Mg_2CoH_5$).

7 Claims, 6 Drawing Sheets

METHOD OF SYNTHESIZING MAGNESIUM-COBALT PENTAHYDRIDE

RELATED APPLICATIONS

This application claims priority to Taiwan Application Serial Number 100102667, filed Jan. 25, 2011, which is herein incorporated by reference.

BACKGROUND

1. Field of Invention

The present invention relates to a method of producing a magnesium (Mg)-based alloy. More particularly, the present invention relates to a method of synthesizing magnesium-cobalt (Co) pentahydride ($Mg_2CoH_5$).

2. Description of Related Art

A Mg-based alloy is generally referred to as an alloy material which is mainly composed of Mg. With the features of lightweight and high hydrogen absorption capacity, the Mg-based alloy has high potential to be applied on a fuel cell system.

Using a Mg-based hydride ($MgH_2$) as an example, although the $MgH_2$ hydride has a high hydrogen absorption capacity up to 7.6 weight percent (wt %), yet the $MgH_2$ hydride has a high hydrogen desorption temperature and is difficult to be formed, thus having limited applications.

Generally speaking, adding another metal, such as nickel (Ni), Co or iron (Fe), etc., into the Mg-based alloy to form magnesium-nickel quadhydride ($Mg_2NiH_4$), a magnesium-cobalt pentahydride ($Mg_2CoH_5$) or a magnesium-ferrum hexahydride ($Mg_2FeH_6$) may improve the property of hydrogen absorption-desorption kinetics for the Mg-based alloy, i.e. the Mg-based alloy may have a better hydrogen absorption-desorption efficiency than pure magnesium, wherein the magnesium-cobalt pentahydride ($Mg_2CoH_5$) has a preferable hydrogen absorption property.

Since pure cobalt is not a hydrogen absorption element, the magnesium-cobalt pentahydride ($Mg_2CoH_5$) may have a greater hydrogen absorption amount if containing less pure cobalt. However, at one hand, it is quite difficult to synthesize the magnesium-cobalt pentahydride ($Mg_2CoH_5$) through a metastable $Mg_2Co$. At first, according to the Mg—Co binary phase diagram, $MgCo_2$ is the only existing stable Mg—Co compound, and the metastable $Mg_2Co$ cannot be synthesized via a conventional smelting process.

On the other hand, the magnesium-cobalt pentahydride ($Mg_2CoH_5$) obtained by the conventional process cannot overcome the problem of leaving residual pure cobalt. Briefly speaking, in the conventional process, magnesium metal power and cobalt metal powder with a mole ratio of 2:1 are ball-milled for 100 hours to more than 200 hours, and then are sintered at high temperature and high pressure in an environment full of hydrogen to form the magnesium-cobalt pentahydride ($Mg_2CoH_5$). After XRD (X-ray Diffraction) analysis, a cobalt diffraction peak still exists in the magnesium-cobalt pentahydride ($Mg_2CoH_5$) obtained, i.e. complete reaction still cannot be achieved even after the ball-milling step has been performed for 200 hours.

In view of the foregoing, there is a need to provide a method of synthesizing magnesium-cobalt pentahydride for overcoming the problem of poor hydrogen absorption-desorption rate caused by the conventional ball milling/sintering or reactive mechanical alloying.

SUMMARY

Hence, an aspect of the present invention is to provide a method of synthesizing magnesium-cobalt pentahydride, wherein a $MgCo_2$ alloy is synthesized by completely reacting cobalt metal and excess magnesium metal, followed by an isothermal evaporation casting process (IECP) for removing the residual magnesium metal, and then the $MgCo_2$ alloy and another magnesium metal are ball-milled and hydrogenated to synthesize the magnesium-cobalt pentahydride ($Mg_2CoH_5$). The aforementioned method can reduce the overall process time, and the magnesium-cobalt pentahydride ($Mg_2CoH_5$) obtained thereby further has an excellent hydrogen absorption-desorption rate since leaving no residual pure cobalt and pure magnesium. Therefore, the method of the present invention is suitable for use in preparing a composite hydrogen-storage material, and can effectively overcome the problem of poor hydrogen absorption-desorption rate caused by the conventional ball milling/sintering or reactive mechanical alloying.

Another aspect of the present invention is to provide magnesium-cobalt pentahydride ($Mg_2CoH_5$) without leaving residual pure cobalt and pure magnesium by using the aforementioned method, thus being applicable to composite hydrogen-storage materials.

According to the aforementioned aspects, a method of synthesizing magnesium-cobalt pentahydride is provided. In one embodiment, the method is used to heat a magnesium metal and a cobalt metal to a first temperature, thereby forming a molten metal. In one example, the content of the cobalt metal is substantially 30 atom percent (at %), and the first temperature is between the melting point of the magnesium metal and the melting point of the cobalt metal for forming a molten metal.

Thereafter, the molten metal is cooled to a second temperature, and then the molten metal is isothermally heated for forming a $MgCo_2$ alloy and removing unreacted pure magnesium therein. In one example, the second temperature is between the first temperature and the melting point of the magnesium metal.

Thereafter, the $MgCo_2$ alloy is cooled down, and then a ball-milling step is performed onto the $MgCo_2$ alloy and another magnesium metal to form metal mixture powder. In one example, the mole ratio of the another magnesium metal to the $MgCo_2$ alloy is substantially 3:1.

Thereafter, a hydrogenation step is performed onto the metal mixture powder for up to 15 hours at a temperature of substantially 100° C. to 600° C. under a hydrogen pressure of substantially 6 atm (atmosphere) to 120 atm, thereby forming magnesium-cobalt pentahydride ($Mg_2CoH_5$) with substantially no residual pure cobalt left. In one example, the hydrogen absorption amount of the $Mg_2CoH_5$ is substantially 2.5 mass percent (mass %) at 350° C., and the hydrogen desorption amount of the $Mg_2CoH_5$ is substantially 2.0 mass % at 350° C.

According to one embodiment of the present invention, the aforementioned magnesium metal and cobalt metal are heated, isothermally heated and ball-milled under vacuum or protection gas.

With the application of the method of the present invention for synthesizing magnesium-cobalt pentahydride, cobalt metal and excess magnesium metal are processed in an IECP to first synthesize a $MgCo_2$ alloy with substantially no residual pure magnesium left, and then the $MgCo_2$ alloy and another magnesium metal are ball-milled and hydrogenated to synthesize magnesium-cobalt pentahydride ($Mg_2CoH_5$). Since the aforementioned method can reduce the overall process time; and the magnesium-cobalt pentahydride ($Mg_2CoH_5$) obtained thereby has no residual pure cobalt and pure magnesium left and further has an excellent hydrogen absorption-desorption rate, the method of the present invention is suitable for use in preparing a composite hydrogen-storage material, and can effectively overcome the problem of poor hydrogen absorption-desorption rate caused by the conventional ball milling/sintering or reactive mechanical alloying.

It is to be understood that both the foregoing general description and the following detailed description are examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

As described above, the present invention provides the method of synthesizing magnesium-cobalt pentahydride, wherein the complete reaction of cobalt metal and excess magnesium metal are used to synthesize the $MgCo_2$ alloy, and then the residual magnesium metal is removed therefrom, and thereafter the $MgCo_2$ alloy and another magnesium metal are ball-milled and hydrogenated to synthesize the magnesium-cobalt pentahydride ($Mg_2CoH_5$) with no residual pure cobalt left.

Method of Synthesizing Magnesium-Cobalt Pentahydride

During the process for synthesizing magnesium-cobalt pentahydride ($Mg_2CoH_5$), since a cobalt metal does not absorb hydrogen, the hydrogen absorption-desorption rate will be disadvantageously affected if residual cobalt is left in the magnesium-cobalt pentahydride ($Mg_2CoH_5$) obtained. Hence, after cobalt metal and excess magnesium metal are melted and fully mixed, the method of the present invention uses an IECP to make all of the cobalt and magnesium completely react to form a $MgCo_2$ alloy and simultaneously to remove the residual magnesium meta, thereby synthesizing the $MgCo_2$ alloy substantially without leaving residual pure magnesium. Thereafter, the $MgCo_2$ alloy and another magnesium metal are ball-milled and hydrogenated to synthesize the magnesium-cobalt pentahydride ($Mg_2CoH_5$) with no residual pure cobalt left.

Figure 1:
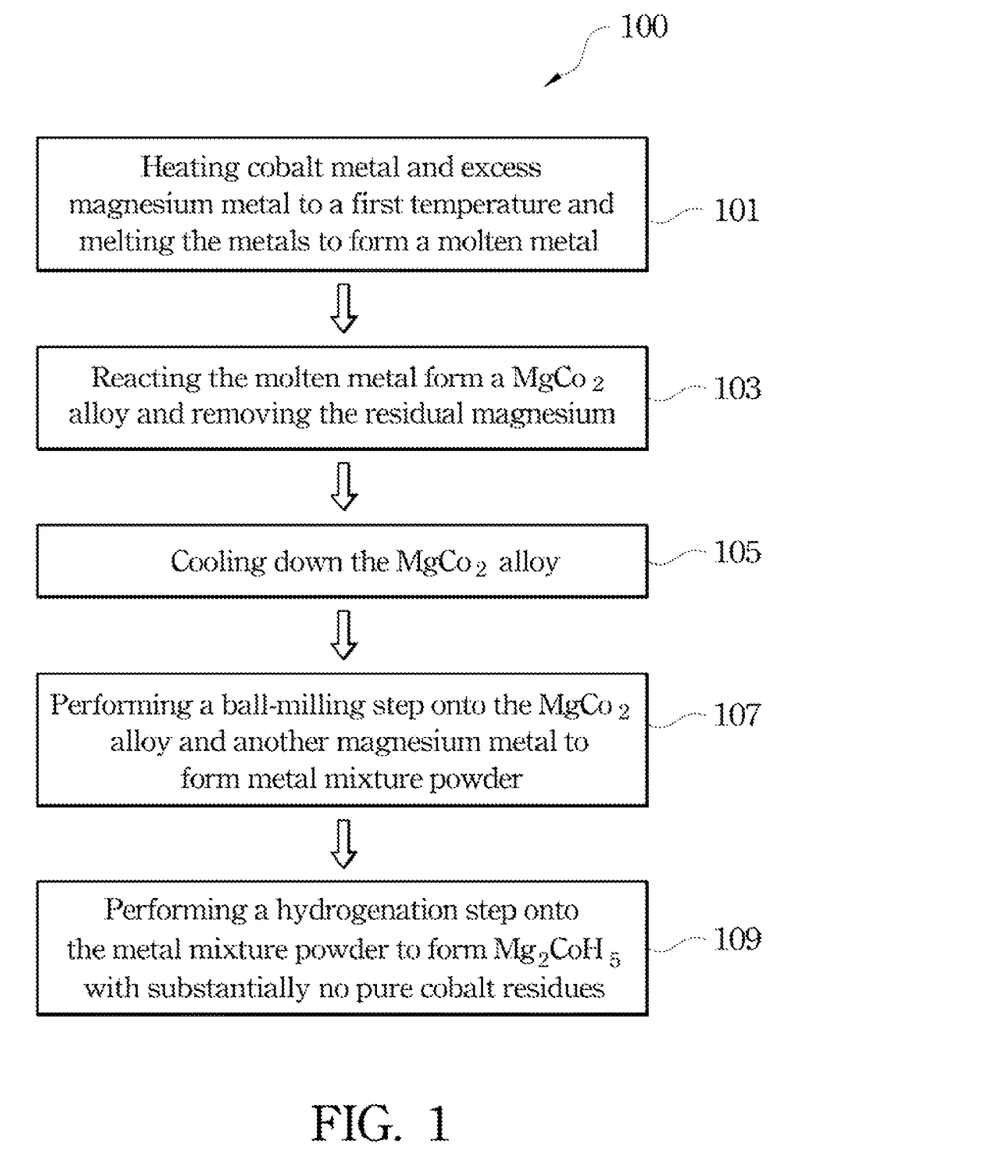
FIG. 1 is a flow chart showing a method of synthesizing magnesium-cobalt pentahydride according to one embodiment of the present invention.

Referring to FIG. 1, FIG. 1 is a flow chart showing a method 100 of synthesizing magnesium-cobalt pentahydride according to one embodiment of the present invention. The method 100 may include but not be limited to the following steps.

At first, in step 101, cobalt metal and excess magnesium metal are heated to a first temperature to form a molten metal, thereby ensuring the cobalt metal to be completely reacted with no residuals. In one example, the content of the cobalt metal is substantially 30 atom percent (Mg-30 at % Co), and the first temperature is between the melting point of the magnesium metal and that of the cobalt metal. For example, the melting point of the cobalt metal is about 1493° C., and the melting point of the magnesium metal is about 650° C., and thus the first temperature can be such as about 900° C. to about 1000° C., or about 925° C. to about 950° C. In another example, the cobalt metal and the magnesium metal are first heated to about 950° C. and melted for 10 minutes, and then are cooled a little bit to about 925° C. and stirred for about 50 minutes, thereby forming a molten metal and ensuring the magnesium metal and the cobalt metal to be uniformly distributed in composition and completely melted.

Thereafter, the molten metal is reacted to form a $MgCo_2$ alloy, and meanwhile the residual magnesium is removed. In step 103, the aforementioned molten metal is cooled to a second temperature and then is isothermally heated, thereby forming the $MgCo_2$ alloy and simultaneously removing the unreacted magnesium. The so-called "isothermally heated" or "isothermally heating" is referred to as an isothermal evaporation casting process (IECP) used for substantially removing the residual magnesium in the $MgCo_2$ alloy. In one example, the second temperature between the first temperature and the melting point of the magnesium metal, and is lower than the first temperature by substantially 150° C. to 200° C. In another example, the $MgCo_2$ alloy is isothermally heated at about 750° C. for about 6 hours to form an alloy and to evaporate the residual pure magnesium, thus ensuring substantially no residual pure magnesium left in the product, $MgCo_2$ alloy.

Thereafter, in step 105, the aforementioned $MgCo_2$ alloy is cooled down.

Since the $MgCo_2$ alloy is a brittle phase and the magnesium metal is a ductile phase, the $MgCo_2$ alloy can form ultra-fine grains, a pseudo-amorphous structure and a nano-structure. Therefore, in step 107, the aforementioned $MgCo_2$ alloy and another magnesium metal are used as a starting material for a ball-milling step which is performed for about 50 hours, thereby forming uniform metal mixture powder. In one example, the mole ratio of the $MgCo_2$ alloy to the another magnesium metal is substantially 1:3. In another example, an abrasive medium used by the ball-milling step can be a stainless steel ball, and the weight ratio of the stainless steel ball to the metal mixture powder can be such as substantially 20:1. In another example, due to heat generated during the ball-milling step, the ball-milling step can be performed for a period of time (such as about 15 minutes) and then stopped for another period of time (such as about 15 minutes).

In order to decrease the chance of the magnesium metal and the cobalt metal being oxidized or polluted by moisture, step 101, step 103, step 105 and step 107 can be performed under vacuum or protection gas for heating, isothermally heating, cooling down and ball-milling. In one example, the aforementioned protection gas can be such as argon or other inert gas.

Thereafter, in step 109, a hydrogenation step can be preformed onto the aforementioned metal mixture powder at a temperature of substantially 100° C. to 600° C. under a hydrogen pressure of substantially 6 atm to 120 atm. Since the metal mixture powder obtained by the ball-milling step has ultra-fine grains and uniform composition and also belongs a stable state, the hydrogenation step only needs to be performed for about 15 hours to obtain magnesium-cobalt pentahydride ($Mg_2CoH_5$) with substantially no residual pure cobalt left. In one example, the hydrogen absorption amount of the $Mg_2CoH_5$ is substantially 2.5 mass % at 350° C., and the hydrogen desorption amount of the $Mg_2CoH_5$ is substantially 2.0 mass % at 350° C.

It is worthy to be noted that, in comparison with the $Mg_2CoH_5$ obtained by the conventional process which easily leaves residual pure magnesium and/or pure cobalt, the $Mg_2CoH_5$ obtained by the present invention does not have residual pure magnesium and pure cobalt left, thus having an excellent hydrogen absorption-desorption rate. In one example, the hydrogen absorption amount of the $Mg_2CoH_5$ is substantially 2.5 mass % at 350° C., and the hydrogen desorption amount of the $Mg_2CoH_5$ is substantially 2.0 mass % at 350° C., and thus are applicable to composite hydrogen-storage materials.

Secondly, in comparison with the conventional process in which the hydrogenation step or even the sintering step is quite time-consuming, the present invention, the present invention uses the $MgCo_2$ alloy and another magnesium metal as a starting material for the ball-milling step, and the metal mixture powder obtained by such a ball-milling step has ultra-fine grains and uniform composition and also belongs a stable state, so that the time for performing the hydrogenation step using such metal mixture powder can be greatly reduced.

Hereinafter, various applications of the method of synthesizing magnesium-cobalt pentahydride will be described in more details referring to several examples below, while not intended to be limiting. Thus, one skilled in the art can easily ascertain the essential characteristics of the present invention and, without departing from the spirit and scope thereof, can make various changes and modifications of the invention to adapt it to various usages and conditions.

Example 1

Preparation of $MgCo_2$ Alloy

In this example, a $MgCo_2$ alloy is prepared. At first, a magnesium metal block and cobalt metal powder (both with more than 99.8% purity), wherein the content of the cobalt metal powder is 30 at % (Mg-30 at % Co). Then, the magnesium metal block and the cobalt metal powder are placed in such as a crucible, and is heated to about 950° C. and melted for 10 minutes, under such as argon gas by, for example, high frequency induction heat, resistive heating, arc heating, arc melting heating, electrical melting heating or plasma heating, etc., thereby forming a molten metal. Thereafter, the molten metal is cooled a little bit to 925° C. and stirred for about 50 minutes, thereby ensuring the magnesium metal and the cobalt metal to be uniformly distributed in composition and completely melted.

Then, the aforementioned molten metal is cooled to about 750° C. and isothermally heated for about 6 hours so as to complete evaporate the residual pure magnesium, thereby forming a $MgCo_2$ alloy and removing unreacted pure magnesium therein. Thereafter, the $MgCo_2$ alloy is cooled down.

Figure 2:
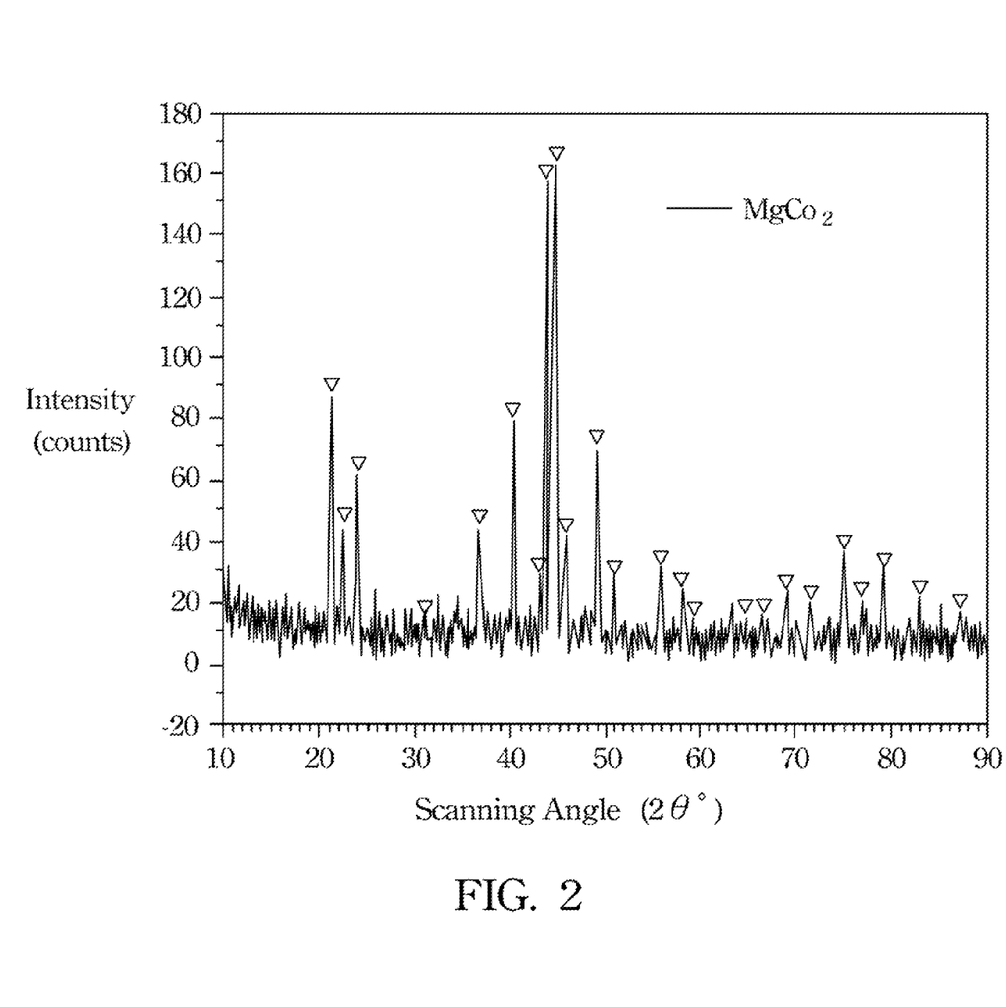
FIG. 2 shows a XRD analysis result of magnesium-cobalt pentahydride according to one embodiment of the present invention.

Referring to FIG. 2, FIG. 2 shows a XRD analysis result of magnesium-cobalt pentahydride according to one embodiment of the present invention, wherein the horizontal axis represents a scanning angle ($2\theta°$), and the vertical axis represents signal intensity (counts). After the analysis using an electron probe microanalyzer (EPMA), the $MgCo_2$ alloy is confirmed, and the atom ration of magnesium to cobalt is 33.5:66.4, which is not different from an ideal value of 33.5:66.6.

Example 2

Preparation of Metal Mixture Powder

Thereafter, the $MgCo_2$ alloy (about 500 mesh) obtained from example 1 and pure magnesium powder are mixed at a mole ratio of 1:3 ($3Mg$—$MgCo_2$), and are used as the starting material for a ball-milling step such as a mechanical alloy ball milling step, thereby obtaining $3Mg$—$MgCo_2$ metal mixture powder. In one example, an abrasive medium used by the ball-milling step can be such as a stainless steel ball (its diameter is about 6 mm), and the weight ratio of the stainless steel ball to the metal mixture powder can be such as 20:1. In another example, due to heat generated during the ball-milling step, the ball-milling step can be performed for a period of time (such as about 15 minutes) and then stopped for another period of time (such as about 15 minutes). Since the pure magnesium powder and the $MgCo_2$ alloy are fully ball-milled, the aforementioned metal mixture powder has substantially no pure cobalt left.

In order to decrease the chance of the magnesium metal and the cobalt icy metal being oxidized or polluted by moisture, the steps of heating, isothermally heating, cooling down and ball-milling can be performed under vacuum or protection gas (such as argon).

Example 3

Preparation of $Mg_2CoH_5$

Thereafter, the $3Mg$—$MgCo_2$ metal mixture powder is placed in a stainless steel reaction vessel under a hydrogen pressure of about 6 atm to 120 atm or about 50 atm, so as to perform a hydrogenation step. In detail, before the hydrogenation step is performed, the reaction vessel has to be vacuumed under about 80° C. for about 1 hour, and then is heated to 100° C. to 600° C. or about 400° C., and then hydrogen is introduced into the reaction vessel for maintaining the hydrogen pressure at about 50 atm. The hydrogenation step is performed for about 15 hours for atom diffusion of the $3Mg$—$MgCo_2$ metal mixture powder, thereby synthesizing magnesium-cobalt pentahydride ($Mg_2CoH_5$).

Figure 3:
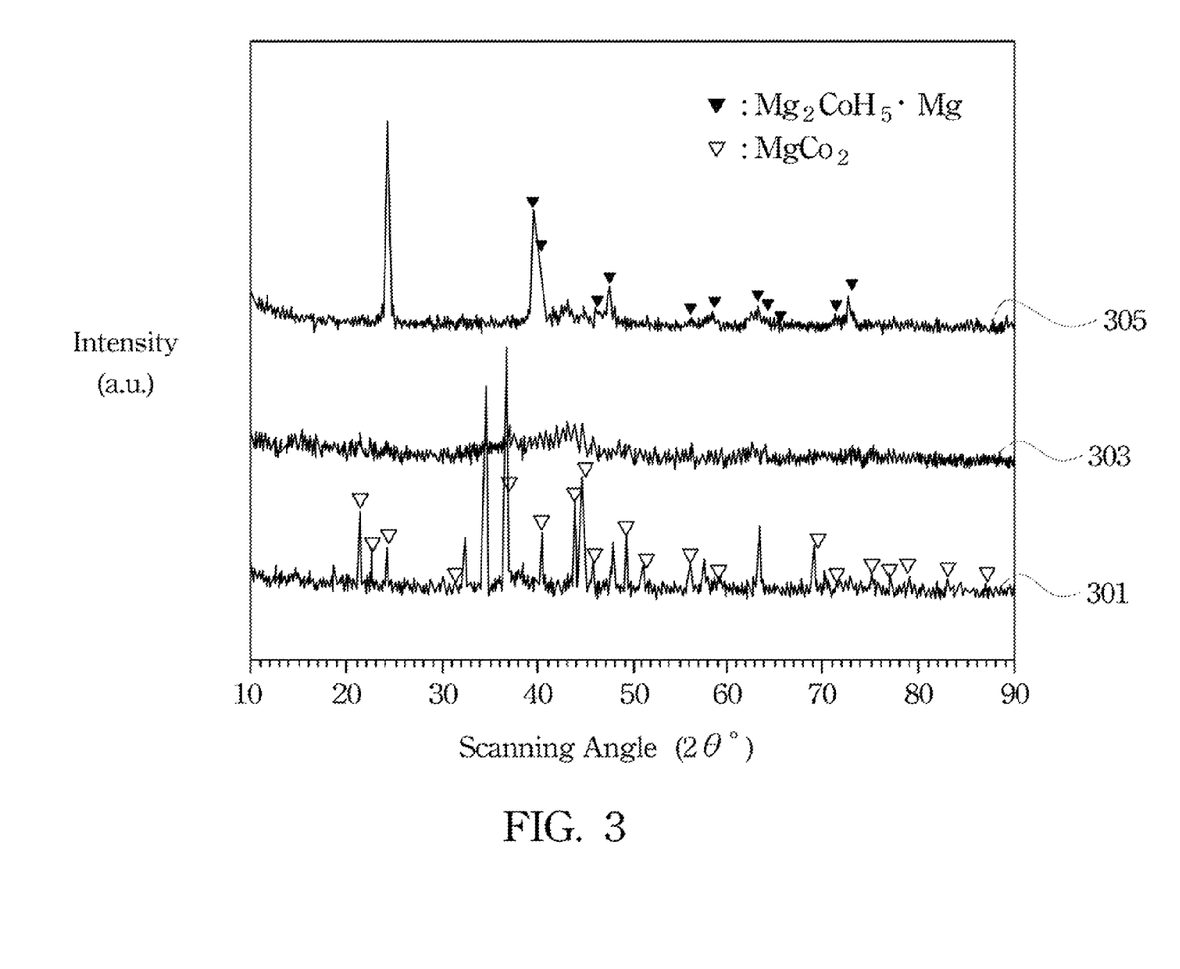
FIG. 3 shows a XRD analysis result of 3Mg—$MgCo_2$ metal mixture powder according to one embodiment of the present invention.

Referring to FIG. 3, FIG. 3 shows a XRD analysis result of $3Mg$—$MgCo_2$ metal mixture powder according to one embodiment of the present invention, wherein the horizontal axis represents a scanning angle ($2\theta°$), and the vertical axis represents signal intensity in an arbitrary unit (a.u.). As shown in FIG. 3, a curve 303 is the XRD analysis result of the $3Mg$—$MgCo_2$ metal mixture powder before ball-milling; a curve 305 is the XRD analysis result of the $3Mg$—$MgCo_2$ metal mixture powder which has been ball-milled for 50 hours; and a curve 307 is the XRD analysis result of the $3Mg$—$MgCo_2$ metal mixture powder which has been ball-milled for 50 hours and hydrogenated.

It can be known from the curve 303 that, after the mixture of Mg and MgCo$_2$ (hexagonal space group: P6$_3$/mmc, JCPDS No. 29-0486) has been ball-milled for about 50 hours, the intensities of diffraction peaks of Mg and MgCo$_2$ are greatly reduced. Secondly, it can be known from the curve 305 that, the Mg$_2$CoH$_5$ is the major hydrogen phase and has no residual pure cobalt left. Hence, as shown in FIG. 3, the case using the 3Mg—MgCo$_2$ metal mixture powder as the starting material can successfully synthesize the Mg$_2$CoH$_5$ without leaving residual pure cobalt.

Example 4

Evaluation of Hydrogen Absorption-Desorption Rate of Mg$_2$CoH$_5$

This example uses, for example, a Sieverts-type gas reaction apparatus to test the absorption-desorption rate of the Mg$_2$CoH$_5$ obtained from example 3.

Prior to the test, the Mg$_2$CoH$_5$ obtained from example 3 may first undergo a secondary activation step of the activation conditions are such as: first placing the Mg$_2$CoH$_5$ at about 350° C. under vacuum for about 2 hours; and then hydrogenating the Mg$_2$CoH$_5$ at about 350° C. under a hydrogen pressure of about 50 atm for about 1 hour.

1. Evaluation of Hydrogen-Desorption Rate

Figure 4:
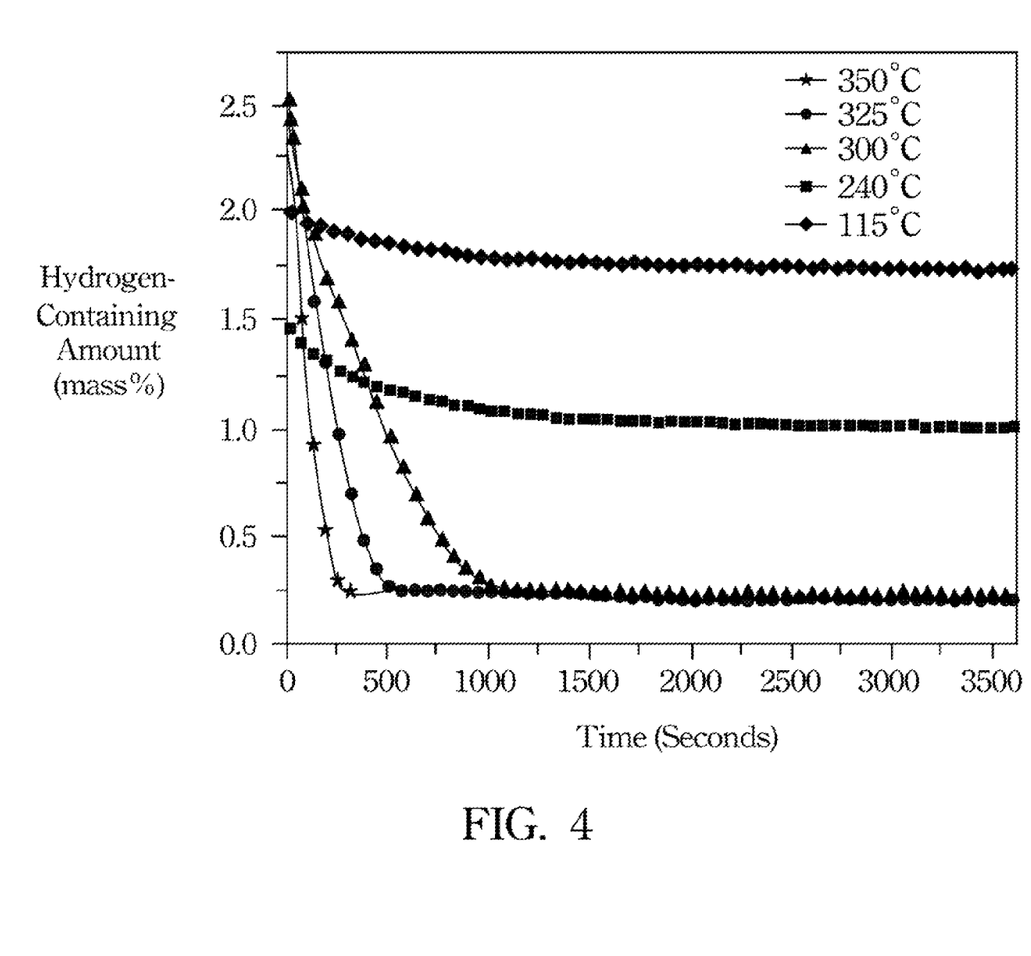
FIG. 4 shows a result about hydrogen-desorption rates of magnesium-cobalt pentahydride according to one embodiment of the present invention.

Referring to FIG. 4, FIG. 4 shows a result about hydrogen-desorption rates of magnesium-cobalt pentahydride according to one embodiment of the present invention, wherein the horizontal axis represents hydrogen-desorption time (seconds), and the vertical axis represents a hydrogen-containing amount (mass %).

It can be known from FIG. 4 that, since the 3Mg—MgCo$_2$ metal mixture powder obtained from example 2 has ultra-fine grains and uniform composition and also belongs a stable state, the hydrogen-desorption amount of the Mg$_2$CoH$_5$ obtained from example 3 can reach balance in about 350 seconds at 350° C., and also can reach balance in about 20 minutes at 300° C. Meanwhile, in comparison with the hydrogen absorption-desorption rate of the Mg$_2$CoH$_5$ obtained by the conventional ball milling/sintering, the hydrogen absorption-desorption rate of the Mg$_2$CoH$_5$ obtained from example 3 is much faster.

Secondly, when hydrogen is desorbed within a temperature zone of about 300° C. to about 350° C., the hydrogen desorption amount of the Mg$_2$CoH$_5$ can reach about 2.0 mass % in about 20 minutes. With no catalyst, the Mg$_2$CoH$_5$ has a hydrogen desorption amount of about 0.3 mass % at 115° C.

2. Evaluation of Hydrogen Absorption-Desorption Amount

Figure 5:
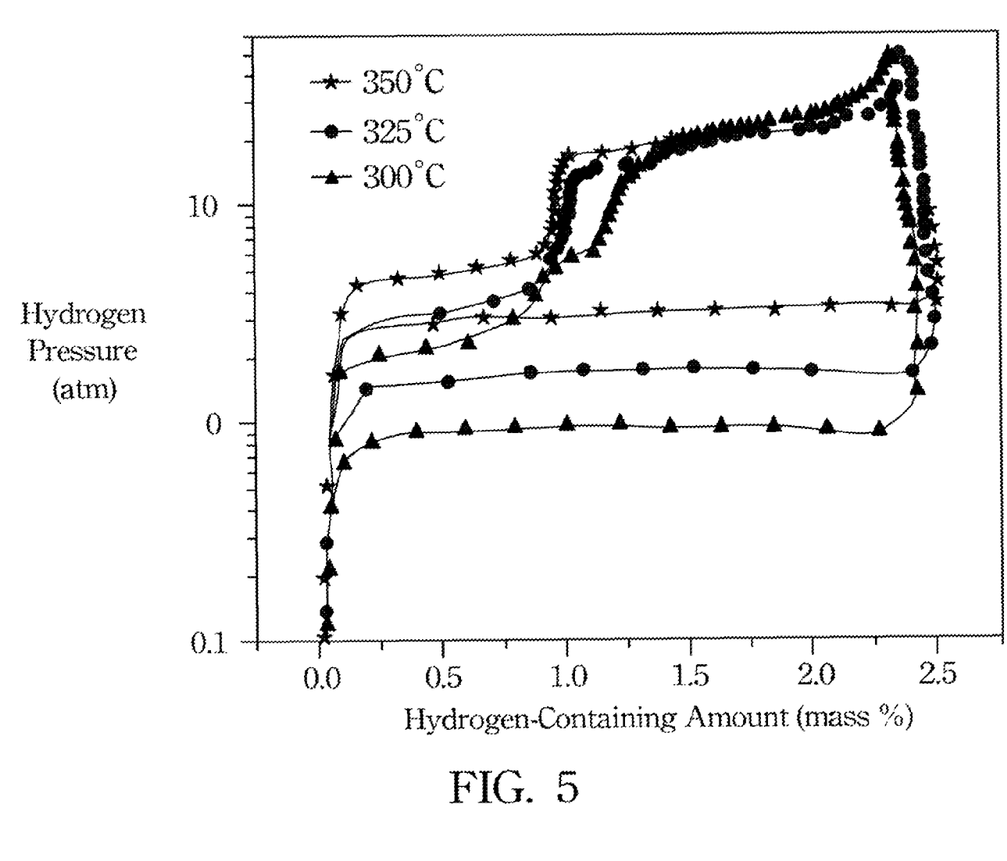
FIG. 5 shows PCI (Pressure-Composition-Isothermal) hydrogen absorption-desorption curves of magnesium-cobalt pentahydride at a temperature of 300° C. to 350° C. according to one embodiment of the present invention.

Referring to FIG. 5, FIG. 5 shows PCI (Pressure-Composition-Isothermal) hydrogen absorption-desorption curves of magnesium-cobalt pentahydride at a temperature of 300° C. to 350° C. according to one embodiment of the present invention, wherein the horizontal axis represents a hydrogen-containing amount (mass %), and the vertical axis represents a hydrogen pressures (atm).

It can be known from FIG. 5 that, when the Mg$_2$CoH$_5$ obtained from example 3 absorbs hydrogen at 300° C., 325° C. and 350° C., hydrogen absorption plateau pressures are shown in two stages, but hydrogen adsorption plateau pressures are shown in one single stage.

Example 5

Comparison with Hydrogen Absorption-Desorption Rate of Mg$_2$CoH$_5$ Obtained by the Conventional Process In this example, a parallel comparison is made between the hydrogen absorption-desorption rate of the Mg$_2$CoH$_5$ obtained from example 3 and that of the Mg$_2$CoH$_5$ obtained by the conventional process.

In the conventional process, magnesium metal power and cobalt metal powder with a mole ratio of 2:1 (2Mg—Co) are used as a starting material for ball milling, and then a mechanical alloy ball milling step and a hydrogenation step are performed to obtain the Mg$_2$CoH$_5$. In this comparison example, the abrasive medium and the hydrogenation step and the process conditions thereof are all referred to example 2 and example 3, and are not described again herein.

Figure 6:
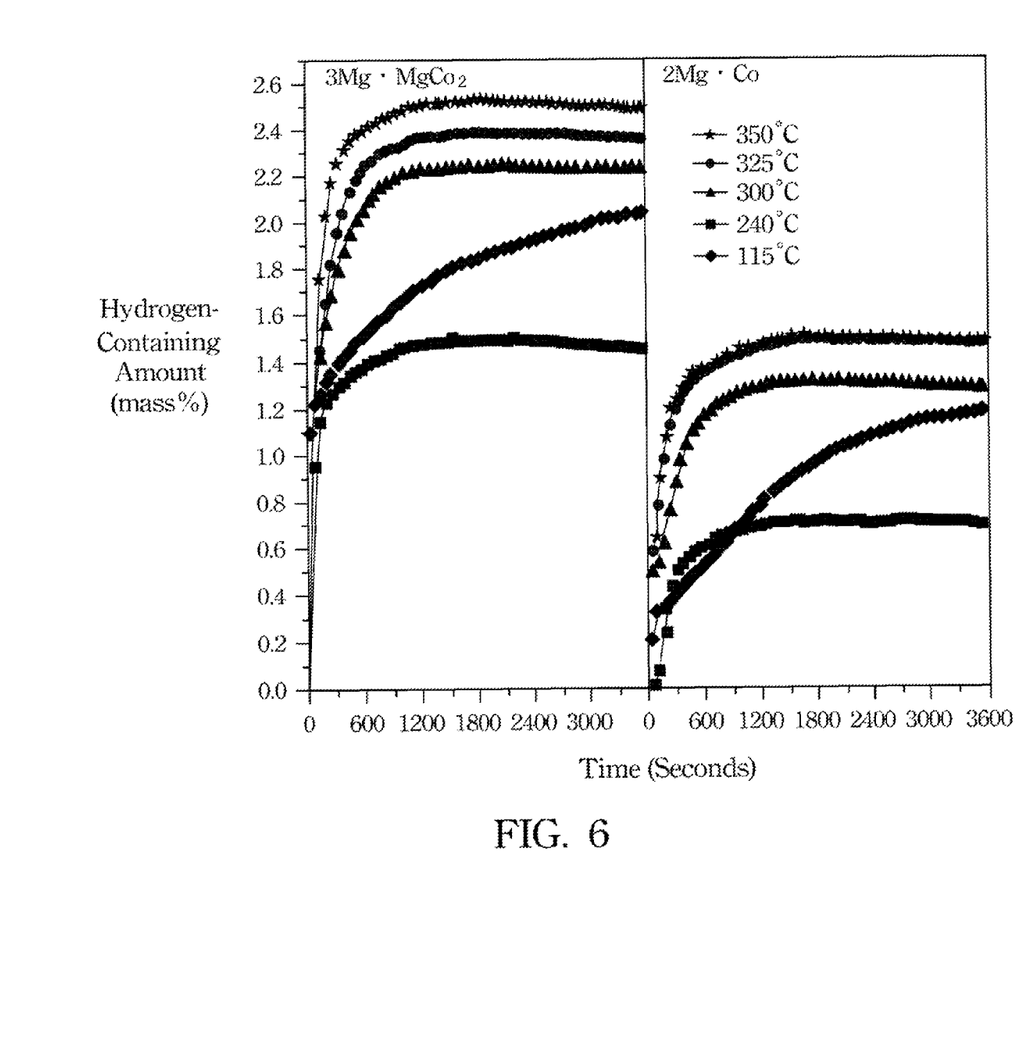
FIG. 6 shows a comparison result between hydrogen-desorption rates of magnesium-cobalt pentahydride obtained by one embodiment of the present invention (the left figure) and those by the conventional process.

Referring to FIG. 6, FIG. 6 shows a comparison result between hydrogen-desorption rates of magnesium-cobalt pentahydride obtained by one embodiment of the present invention (the left figure) and those by the conventional process, wherein the horizontal axis represents hydrogen adsorption time (seconds), and the vertical axis represents a hydrogen-containing amount (mass %).

It can be known from FIG. 6 that, when the hydrogen absorption amounts of the Mg$_2$CoH$_5$ obtained from example 3 at 300° C., 325° C. and 350° C. are about 2.5 mass %, 2.3 mass %, 2.2 mass %, 2.0 mass % and 1.5 mass % respectively. Secondly, the Mg$_2$CoH$_5$ obtained from example 3 has excellent hydrogen absorption kinetics at 350° C., which has the hydrogen absorption capability of reaching more than 2.1 mass % (80% of saturated hydrogen absorption) in 260 seconds and can reach the maximum saturated hydrogen absorption in 20 minutes without generating any delay of hydrogen absorption.

In comparison, the maximum hydrogen absorption of the Mg$_2$CoH$_5$ obtained by the conventional process is only about 1.5 mass % at 350° C. Such a hydrogen absorption drop may be attributed to the conditions of ball-milling and hydrogenation in the conventional process which fails to fully mix magnesium and cobalt.

It is worthy to be noted that, the present invention first uses the IECP to synthesize cobalt metal and excess magnesium metal to synthesize the MgCo$_2$ alloy substantially without leaving residual pure magnesium, and performs ball-milling and hydrogenation onto the MgCo$_2$ alloy and another magnesium metal to synthesize the Mg$_2$CoH$_5$ substantially without leaving residual pure cobalt. Accordingly, the present invention not only reduces the overall process time, but also effectively overcomes the problem of poor hydrogen absorption-desorption rate caused by the conventional ball milling/sintering or reactive mechanical alloying. The Mg$_2$CoH$_5$ obtained thereby further has an excellent hydrogen absorption-desorption rate since leaving no residual pure cobalt and pure magnesium, and thus is suitable for use in a composite hydrogen-storage material.

The aforementioned Mg$_2$CoH$_5$ is widely applicable to various types of composite hydrogen-storage material or hydrogen absorption layers, and its form includes but not limited to the composite hydrogen-storage material of a fuel cell or the hydrogen absorption layer of a switchable mirror, etc., which is not described in detail herein. Further, it has to be supplemented that, although the present invention uses some technical details such as specific types or ratios of metals, specific processing conditions, specific equipments and specific analyzing methods as exemplary embodiments for obtaining the aforementioned $Mg_2CoH_5$, yet the present invention is not limited thereto and not all of the embodiments requires all of the aforementioned technical details. As is understood by those who are skilled in the art, the aforementioned $Mg_2CoH_5$ can be obtained by using other types or ratios of metals, other processing conditions, other equipments and other analyzing methods without departing from the scope or spirit of the invention.

According to the embodiments of the present invention, the method of the present advantageously uses the IECP to synthesize cobalt metal and excess magnesium metal to synthesize the $MgCo_2$ alloy substantially without leaving residual pure magnesium, and performs ball-milling and hydrogenation onto the $MgCo_2$ alloy and another magnesium metal to synthesize the $Mg_2CoH_5$ substantially without leaving residual pure cobalt. The aforementioned method can reduce the overall process time, and the magnesium-cobalt pentahydride ($Mg_2CoH_5$) obtained thereby further has an excellent hydrogen absorption-desorption rate since leaving no residual pure cobalt and pure magnesium. Therefore, the method of the present invention is suitable for use in preparing a composite hydrogen-storage material, and can effectively overcome the problem of poor hydrogen absorption-desorption rate caused by the conventional ball milling/sintering or reactive mechanical alloying.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of synthesizing magnesium-cobalt pentahydride, comprising:
    melting a magnesium (Mg) metal and a cobalt (Co) metal at a first temperature, wherein the content of the cobalt metal is substantially 30 atom percent (at %), and the first temperature is between the melting point of the magnesium metal and the melting point of the cobalt metal, thereby forming a molten metal;
    cooling the molten metal to a second temperature and then isothermally heating the molten metal for forming a $MgCo_2$ alloy, and removing unreacted pure magnesium, wherein the second temperature is between the first temperature and the melting point of the magnesium metal;
    cooling down the $MgCo_2$ alloy;
    performing a ball-milling step onto the $MgCo_2$ alloy and another magnesium metal to form metal mixture powder, wherein the mole ratio of the $MgCo_2$ alloy to the another magnesium metal is substantially 1:3;
    performing a hydrogenation step onto the metal mixture powder for up to 15 hours at a temperature of substantially 100° C. to 600° C. under a hydrogen pressure of substantially 6 atm (atmosphere) to 120 atm so as to form magnesium-cobalt pentahydride ($Mg_2CoH_5$) without leaving residual pure cobalt, wherein the hydrogen absorption amount of the $Mg_2CoH_5$ is substantially 2.5 mass percent (mass %) at 350° C., and the hydrogen desorption amount of the $Mg_2CoH_5$ is substantially 2.0 mass % at 350° C.

2. The method as claimed in claim 1, wherein the magnesium metal and the cobalt metal are heated, isothermally heated and ball-milled under vacuum or protection gas.

3. The method as claimed in claim 2, wherein the protection gas is inert gas.

4. The method as claimed in claim 1, wherein the first temperature is higher than the second temperature by substantially 150° C. to 200° C.

5. The method as claimed in claim 1, wherein the ball-milling step is performed by using an abrasive medium, and the weight ratio of the abrasive medium to the metal mixture powder is substantially 20:1.

6. The method as claimed in claim 1, wherein the hydrogenation step is performed at 400° C.

7. The method as claimed in claim 1, wherein the hydrogenation step is performed under 50 atm.

* * * * *